Patented Aug. 25, 1931

1,820,432

UNITED STATES PATENT OFFICE

LAWRENCE BRADSHAW, OF BAINBRIDGE, NEW YORK, ASSIGNOR, BY MESNE ASSIGNMENTS, TO THE CASEIN MANUFACTURING COMPANY OF AMERICA, INC., OF NEW YORK, N. Y., A CORPORATION OF DELAWARE

ADHESIVE BASE

No Drawing. Application filed June 19, 1926. Serial No. 117,174.

This invention relates to the production of adhesives suitable for the gluing together of plywood, wood joints and the like; for attaching mineral matter to paper and cloth; for binding sawdust, granular cork and fibrous materials in the manufacture of floor coverings and for other purposes where a comparatively inexpensive adhesive is required.

In carrying out this invention I use as a raw material the peanut or certain of its constituent parts, which is made into an adhesive by suitable treatment with an alkaline reacting salt in the presence of water. As examples of the materials so used may be mentioned (1) the whole peanut kernel, (2) the cotyledons after removal of the skin, both of these with or without the partial or complete removal of the oil by pressing or by extraction by solvents; (3) the press-cake obtained as a by-product in the peanut oil industry, usually containing a considerable amount of hull fibre and some residual oil. All of these materials are rich in protein.

It has been found that the glues prepared from these various materials by the methods described below differ considerably in their physical properties, e. g. in color, viscosity, spreading capacity and adhesive power.

Whichever material is used, it is first crushed, or ground to a finely divided condition. It is then mixed with a protein solvent such as sodium carbonate or other suitable alkaline substance and, in cases where a waterproof adhesive is required, with lime or other alkaline earth oxide or hydroxide. In some cases, for making a cheap glue base, peanut materials as above stated can be mixed with lime alone, but preferably I use the salts, as described above. Water is subsequently added preferably to this complete mixture.

Although a reasonably strong plywood panel has been obtained from the crushed peanut kernel (containing approximately 45% oil) by the formula in Example 1 (below), it is preferred to remove the major portion of the oil by pressing, both for reasons of economy and also in order to bring about a concentration of the proteid and adhesive substances which are the real basis of the glue, as well as to produce a glue which is much stronger due to the absence of this large excess of oil. In general, the oil-content of the peanut material used should preferably not exceed 15%. In certain cases, for example in the preparation of the best grade of paper-sizing, the oil may be first completely removed by solvent extraction; while in other cases the presence of a small amount of oil (say 6% to 8%) may be an advantage, for instance in waterproof plywood cements where it is found to be effective in diminishing the wear and dulling action on the tools used in working the dry plywood.

The glues prepared from the pressed and ground cotyledons (with the red skins removed), are white or pale yellow, free-flowing, tacky and stringy, bearing a close resemblance to casein glues. They are particularly useful for the coating of paper, for wood joints and in all cases where color is undesirable. Glues made from the pressed kernels, without removing the colored skins are substantially tinted; while those from the ground press-cake of commerce have a uniform light reddish-brown color. These may be used for making plywood; for attaching dark colored pigments to paper and cloth, and in similar cases where color in the adhesive is not objectionable. The glues obtained from the pulverized commercial meal are inferior in tackiness and flowing capacity to those made from the pressed cotyledons, but do not differ therefrom greatly in adhesive strength, and the presence of the hull fibre which they contain appears to be advantageous in the gluing-up of soft woods, especially when the surfaces are uneven.

After the oil-content has been reduced by suitable treatment to 15% or below, the meal is subjected to a process of fine grinding. Material intended for use in wood glues is reduced preferably to at least 120 mesh, although a coarser meal of approximately 80 mesh has given satisfactory results in some cases. For paper coating, extreme fineness is desirable, say at least 200 mesh or preferably 220 to 300 mesh.

The following examples of mixes which have given successful reslts when applied to wood joints, laminated woods, paper coatings and the like, as indicated in the specific examples, will serve to define more particularly the character of the invention but I do not desire to be restricted to the particular compounds or proportions herein set forth. In order to distinguish the different peanut materials employed, the powder derived from the kernel (including the skin) is termed "peanut flour"; that from the cotyledons (after removal of the skins) "cotyledon flour"; and that from the press-cake commercially used as feeding-stuff "peanut press-cake meal".

The parts given are by weight:—

Example 1

Peanut flour 67 parts, calcium hydroxide 18 parts, sodium carbonate 7 parts, tri sodium phosphate 4 parts, sodium fluoride 4 parts. (For laminated wood.)

Example 2

Peanut press-cake meal 71 parts, hydrated lime 20 parts, sodium carbonate 9 parts. (For laminated wood.)

Example 3

Peanut flour 70 parts, hydrated lime 15 parts, magnesium oxide 5 parts, sodium carbonate 6 parts, sodium fluoride 3 parts, sodium arsenate 1 part. (For laminated wood.) Peanut meal can be used in a similar manner, and in the same proportion, and the product also can be used for gluing up laminated wood.

Example 4

Peanut cotyledon flour 66 parts, hydrated lime 18 parts, sodium carbonate 8 parts, tri sodium phosphate 3 parts, sodium fluoride 5 parts. (For wood joints and laminated woods.)

Example 5

Peanut meal 72 parts, hydrated lime 20 parts, sodium fluoride 8 parts. (For laminated wood.)

Example 6

Peanut press cake 81 parts, sodium fluoride 7 parts, sodium carbonate 12 parts. (For wood joints, where a water-resisting adhesive is not needed.)

Example 7

Peanut meal (solvent extracted) 75 parts, hydrated lime 15 parts, sodium fluoride 5 parts, caustic soda 4 parts. (For gluing plywood, when the glue is to be made up from the base, without any substantial delay.)

The foregoing examples represent the dry materials which are mixed to form the "glue base" as the term is commonly used in the art. To prepare for use, the dry mixture is incorporated with sufficient cold water to form a smooth flowing glue. The water is placed in a kettle provided with an efficient stirrer; the dry glue base is added slowly and the whole mixed thoroughly for about 20 minutes, and is then ready for use. About 2 to 2½ parts of water to 1 part of the dry base are preferred.

In the appended claims, I use the term "adhesive material" to cover both the dry "glue base" as herein described, and the mixture of the same with water to form the fluid adhesive ready for use. The glue base has latent or potential adhesive properties which are developed upon mixing with water.

Example 8

Peanut cotyledon flour (about 220 mesh) 85 parts, tri-sodium phosphate 15 parts. (For paper coating.)

Example 9

Peanut cotyledon flour (about 220 mesh) 87 parts, tri-sodium phosphate 8 parts, borax 5 parts. (For paper coating.)

The dry materials indicated in Example 8 are thoroughly blended by mixing together in a suitable mixing machine. To prepare for use, 100 parts of this mixture are added to about 400 parts by weight of cold water, stirred until free from lumps and preferably heated to about 160° Fahr. The sizing may thereafter be used either hot or cold. For use in the coating of paper the wet sizing thus prepared (which constitutes an adhesive substance) is added to an aqueous suspension of clay or other coating substance employed in the art (containing about 50% of solid matter), in the proportion of 50 to 125 parts by weight of the wet sizing to 100 parts of the dry clay or other substance. The mixture is then thoroughly stirred, diluted with water to the required consistency, strained and applied by the usual methods. The materials of Example 9 can be treated in a similar manner.

In paper-coating compositions of the kind described herein, the reaction products of the peanut meal and alkali, act as an adhesive to attach the particles of clay, etc., to the paper.

The term "water-soluble alkaline-reacting compound of an alkali-forming metal" includes such salts as sodium carbonate, tri-sodium phosphate, sodium arsenate, (alkali metal salts) and calcium oxide and hydroxide as well as the corresponding magnesium, barium and strontium compounds (alkaline earth metal compounds) and equivalent substances.

The term "alkaline earth oxide" as used herein is intended to embrace both the oxides and hydroxides of the alkaline earth metals calcium, barium, strontium and of magnesium as well as mixtures of these oxides and hydroxides.

By the term "proteaginous peanut meal" used in certain of the appended claims, I intend to cover all of the solid peanut products named in the second paragraph of this specification.

It may be noted that the presence of the red skins which envelop the cotyledons of the peanut, if left in, will give a more or less reddish color to the product, and in certain uses this would be objectionable; hence, in cases where a white or very light colored product is desired I use the cotyledons from which the red skins have been removed. I use the term "light-colored" to distinguish the products thus obtained by the use of the cotyledons freed from the red skins.

I desire to make it clear that no claim is made to the use of the isolated protein of the peanut.

The term "sizing" is intended to imply the attaching of solid matter, (e. g. clay or the like) to paper, by means of an adhesive material.

It will be understood that in most cases, the glue base will be made at the factory and the dissolving (or mixing with water) will be done later at the place where the glue or sizing is to be used.

I claim:

1. A new adhesive material comprising proteaginous peanut meal and an alkaline earth oxide together with an alkali metal salt which in aqueous solution will react with the said alkaline earth oxide to produce a solvent for protein, said adhesive material being alkaline when in the presence of water substantially as described.

2. A new base for the manufacture of products of an adhesive character, comprising a proteaginous peanut meal, an alkaline earth oxide in amount sufficient to maintain the adhesive material alkaline and a substantial amount of a soluble alkali metal salt capable of reacting with the alkaline earth oxide in the presence of water to form caustic alkali.

3. A new base for the manufacture of adhesive compositions comprising proteaginous peanut meal and a water-soluble, alkaline-reacting salt.

4. A new adhesive material comprising proteaginous peanut meal and a metal salt which in aqueous solution has an alkaline reaction, together with an alkaline earth oxide capable of reacting with said salt when in aqueous solution.

5. A new adhesive material comprising proteaginous peanut meal and an alkaline earth oxide together with an alkali metal salt which in presence of water can react with the said alkaline earth oxide to produce a solvent for protein.

6. A new adhesive material containing light-colored proteaginous peanut meal and an alkali metal salt which in aqueous solution is capable of dissolving protein, together with sufficient water to impart a workable fluid consistency.

7. A new base for the manufacture of an adhesive composition comprising proteaginous peanut meal and a water-soluble, alkaline-reacting compound of an alkali-forming metal in amount sufficient to maintain the mixture alkaline when water is subsequently added.

8. A new base for the manufacture of products of an adhesive character, comprising proteaginous peanut meal, an alkaline earth oxide in amount sufficient to maintain the material alkaline and a soluble alkali metal salt capable of reacting with the latter in the presence of water to form caustic alkali in sufficient amount to dissolve the proteid matter of said peanut meal.

9. A new base for the manufacture of adhesive compositions comprising proteaginous peanut meal and a water-soluble salt capable of dissolving the proteid matter of said peanut meal.

10. A new adhesive material comprising proteaginous peanut meal and a metal salt which in aqueous solution has an alkaline reaction, together with an alkaline earth oxide.

11. A new base for the manufacture of adhesive compositions, comprising proteaginous peanut meal and an alkaline earth oxide which in presence of water is capable of combining with vegetable proteins.

12. A new adhesive material comprising a proteaginous peanut meal, a non-acid alkali metal salt, and an alkaline earth oxide in amount sufficient to maintain the adhesive material alkaline in the presence of water.

13. A new adhesive material comprising proteaginous peanut meal and an alkaline material which in the presence of water will constitute a solvent for the protein of the peanut meal.

14. As a new material in the art of adhesives, the flour of uncooked peanut cotyledons, substantially free from the enveloping red skins and substantially free from the outer shell substance, and containing not more than a small fraction of the oil normally present in whole uncooked peanut cotyledons together with a substantially colorless alkaline material capable, upon mixing with water, of reacting with the protein of such flour.

15. A new glue base comprising a dry mixture containing the proteinaceous solid part of peanuts in a comminuted state, an alkaline earth oxide and an alkaline salt of an alkali metal.

In testimony whereof I affix my signature.

LAWRENCE BRADSHAW.